US010197998B2

(12) United States Patent
Steele et al.

(10) Patent No.: US 10,197,998 B2
(45) Date of Patent: *Feb. 5, 2019

(54) REMOTELY CONTROLLED MOTILE DEVICE SYSTEM

(71) Applicant: SPIN MASTER LTD., Toronto (CA)

(72) Inventors: Edwin Steele, Etobicoke (CA); Michael Shivas, Los Angeles, CA (US)

(73) Assignee: SPIN MASTER LTD., Toronto (CA)

( * ) Notice: Subject to any disclaimer, the term of this patent is extended or adjusted under 35 U.S.C. 154(b) by 96 days.

This patent is subject to a terminal disclaimer.

(21) Appl. No.: 15/385,728

(22) Filed: Dec. 20, 2016

(65) Prior Publication Data

US 2017/0185081 A1 Jun. 29, 2017

Related U.S. Application Data

(60) Provisional application No. 62/271,232, filed on Dec. 27, 2015, provisional application No. 62/286,433, filed on Jan. 24, 2016.

(51) Int. Cl.
G09B 9/00 (2006.01)
G05D 1/00 (2006.01)
(Continued)

(52) U.S. Cl.
CPC ......... *G05D 1/0016* (2013.01); *B64C 39/024* (2013.01); *G05D 1/0038* (2013.01);
(Continued)

(58) Field of Classification Search
CPC ...... G05D 1/0016; G05D 1/0038; G09B 9/00; B64C 39/024; B64C 2201/027; B64C 2201/146; G06F 3/0346
See application file for complete search history.

(56) References Cited

U.S. PATENT DOCUMENTS 7,689,321 B2 * 3/2010 Karlsson ............. G05D 1/0246
318/103
8,352,643 B2 1/2013 Birnbaum et al.
(Continued)

OTHER PUBLICATIONS

Hasunuma et al., Development of Teleoperation Master Systerm with a Kinesthetic Sensatin of Presence, 99, Internet. p. 1-7 (Year: 1999).*
(Continued)

*Primary Examiner* — McDieunel Marc
(74) *Attorney, Agent, or Firm* — Millman IP Inc.

(57) ABSTRACT

A remotely controlled motile device system comprises a remotely controlled motile device, and a mobile smart device that comprises a data processor operatively connected to a display screen, a memory, a user input interface, a camera, and a wireless transceiver. The memory stores computer-readable instructions that, when executed by the data processor, cause the mobile smart device to capture images of an optical reference background and the remotely controlled motile device, present the images on the display screen, register a target position relative to the optical reference background and entered via the user input interface, determine a pose of the remotely controlled motile device relative to the optical reference background, and transmit commands to the remotely controlled motile device to move to the target position.

16 Claims, 12 Drawing Sheets

(51) Int. Cl.
*B64C 39/02* (2006.01)
*G06F 3/0346* (2013.01)

(52) U.S. Cl.
CPC ............. *G06F 3/0346* (2013.01); *G09B 9/00* (2013.01); *B64C 2201/027* (2013.01); *B64C 2201/127* (2013.01); *B64C 2201/146* (2013.01)

(56) References Cited

U.S. PATENT DOCUMENTS

| | | | |
|---|---|---|---|
| 8,751,063 | B2 | 6/2014 | Bernstein et al. |
| 8,882,560 | B2 | 11/2014 | Sofman et al. |
| 9,067,145 | B2 | 6/2015 | Sofman et al. |
| 9,087,403 | B2 | 7/2015 | Keating et al. |
| 9,159,133 | B2* | 10/2015 | Ramanandan ........... G06T 7/004 |
| 9,171,204 | B2 | 10/2015 | Acharya et al. |
| 9,317,972 | B2 | 4/2016 | Forutanpour et al. |
| 9,349,218 | B2 | 5/2016 | Keating et al. |
| 9,361,730 | B2 | 6/2016 | Keating et al. |
| 2006/0223637 | A1 | 10/2006 | Rosenberg |
| 2009/0081923 | A1 | 3/2009 | Dooley et al. |
| 2010/0178966 | A1 | 7/2010 | Seydoux |
| 2011/0221692 | A1 | 9/2011 | Seydoux et al. |
| 2013/0065482 | A1 | 3/2013 | Trickett |
| 2014/0028850 | A1 | 1/2014 | Keating et al. |
| 2014/0035736 | A1 | 2/2014 | Weddle et al. |
| 2014/0270348 | A1 | 9/2014 | Wagner et al. |
| 2014/0344762 | A1 | 11/2014 | Grasset et al. |
| 2015/0057844 | A1 | 2/2015 | Callou et al. |
| 2015/0170421 | A1 | 6/2015 | Mandella et al. |
| 2015/0179147 | A1 | 6/2015 | Rezaiifar et al. |
| 2015/0193980 | A1 | 7/2015 | Pedley et al. |
| 2015/0224400 | A1 | 8/2015 | Goslin |
| 2015/0375128 | A1 | 12/2015 | Villar et al. |
| 2016/0309124 | A1 | 10/2016 | Yang et al. |
| 2017/0031369 | A1 | 2/2017 | Liu et al. |
| 2017/0059326 | A1* | 3/2017 | Zhang ................... G01C 21/165 |
| 2017/0185081 | A1* | 6/2017 | Steele ................... G05D 1/0016 |

OTHER PUBLICATIONS

Miller et al., Sensitivity Analysis of a Tightly-Coupled GPS/INS System for autonomous Navigation, 2012, IEEE, p. 1115-1135 (Year: 2012).*

Kleinert et al., On Sensor Pose Parameterization for Inertial Aided Visual SLAM, 2012, IEEE, p. 1-9 (Year: 2012).*

Sian et al., Whole Body Teleoperation of a Humanoid Robot Development of a Simple Master Device using Joysticks, 2002, IEEE, p. 2569-2574 (Year: 2002).*

U.S. Appl. No. 14/979,374, Non-Final Office Action, dated Nov. 17, 2017, US Patent & Trademark Office.

Forza Horizon Published by Microsoft Studios in Oct. Of 2012 (http://marketplace.xbox.com/en-US/Product/Forza-Horizon/66acd000-77fe-1000-9115-d8024d5309c9).

"Forza Horizon Tips: Dak's Garage and Custom Upgrades" published Oct. 26, 2012 by KILLERBanshee (https://www.youtube.com/watch?v=f PLc-2pwUoc).

* cited by examiner

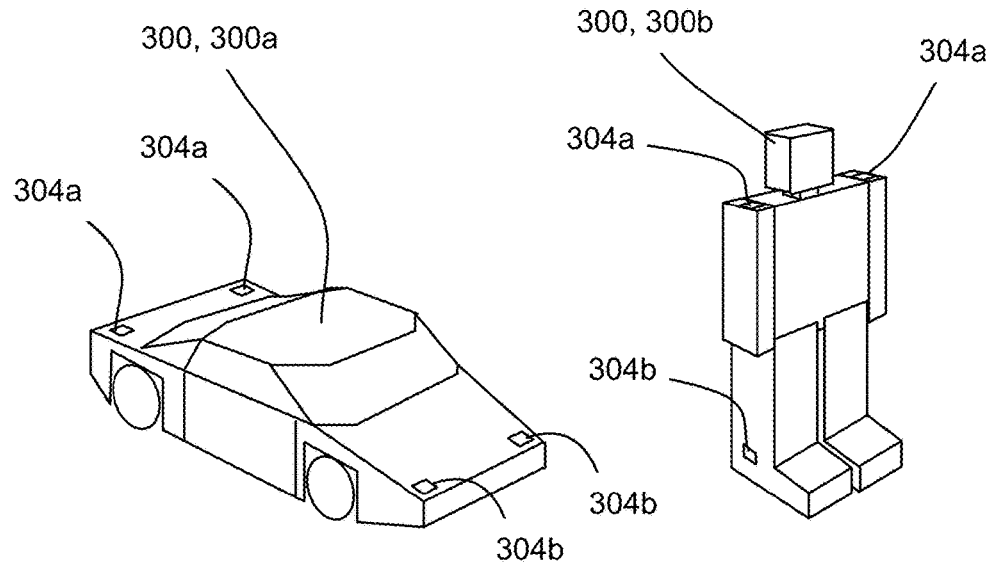
FIG. 11A                    FIG. 11B
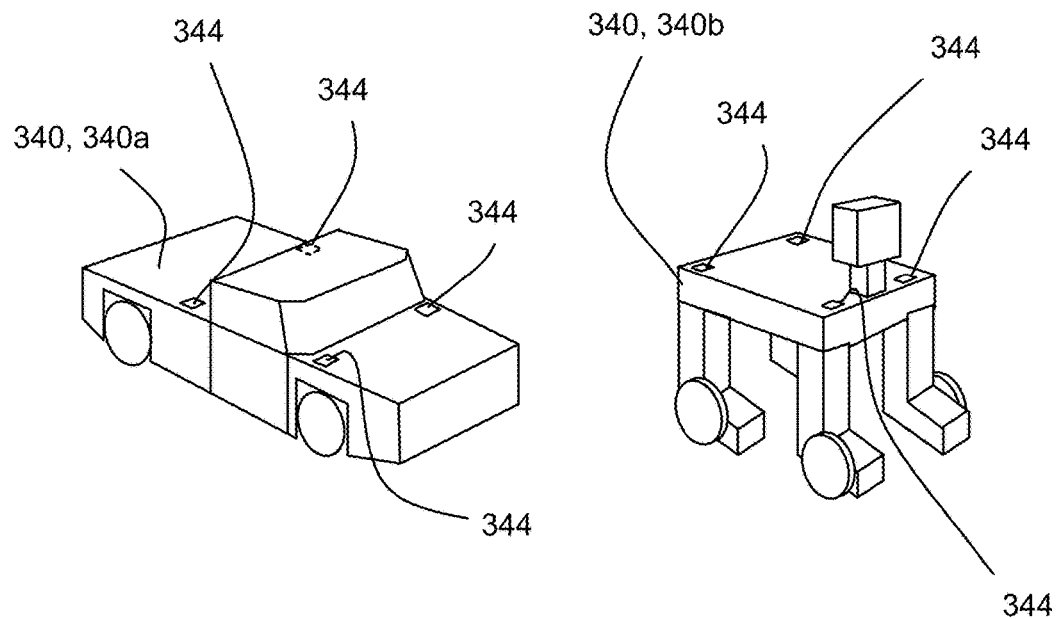
FIG. 12A                    FIG. 12B

REMOTELY CONTROLLED MOTILE DEVICE SYSTEM

CROSS-REFERENCE TO RELATED APPLICATIONS

This application claims the benefit of U.S. Provisional Patent Application Nos. 62/271,232, filed Dec. 27, 2015, and 62/286,433, filed Jan. 24, 2016, the contents of which are incorporated herein by reference in their entirety.

FIELD

The present disclosure relates to the field of remote control devices and, more particularly, to remotely controlled motile device systems.

BACKGROUND OF THE DISCLOSURE

Drones that are used recreationally are increasingly popular. However, there are several aspects of such devices that remain problematic. For example, it can be difficult to control the flight of a drone using the controls traditionally used for remote controlled vehicles today. It would be beneficial to provide new ways of controlling the flight of a drone that are easier to master than some current systems, particularly for novices. Such ways could be beneficial for remotely controlling the operation of other vehicles also.

It would also be beneficial to provide a means for determining the position of a drone or other vehicle, particularly when used with a new way for remotely controlling the operation of the vehicle.

SUMMARY OF THE DISCLOSURE

In one aspect, a remotely controlled motile device system is provided, comprising a remotely controlled motile device, and a mobile smart device, comprising a data processor operatively connected to a display screen, a memory, a user input interface, a camera, and a wireless transceiver. The memory stores computer-readable instructions that, when executed by the data processor, cause the mobile smart device to capture images of an optical reference background and the remotely controlled motile device, present the images on the display screen, register a target position relative to the optical reference background and entered via the user input interface, determine a pose of the remotely controlled motile device relative to the optical reference background, and transmit commands via the wireless transceiver to the remotely controlled motile device to move to the target position.

The mobile smart device can register the target position received via the user input interface in two dimensions.

The mobile smart device can comprise a touch screen that registers the target position received via the user input interface as a point one of at and above a surface of the optical reference background.

The mobile smart device can comprise a touch screen that registers the target position received via the user input interface as a point along a surface of the optical reference background.

The mobile smart device can register the target position received via the user input interface in three dimensions.

The remotely controlled motile device can comprise a set of fiducial points, and the computer-readable instructions that, when executed by the data processor, cause the mobile smart device to implement a visual pose estimator that comprises a blob tracker that determines the pose of the remotely controlled motile device by detecting the set of fiducial points relative to the optical reference background.

The remotely controlled motile device can comprise a set of fiducial points, and the computer-readable instructions, when executed by the data processor, can cause the mobile smart device to implement a visual pose estimator that comprises a surface design tracker which determines the pose of the remotely controlled motile device based on the surface design of the remotely controlled motile device relative to the optical reference background.

According to another aspect, there is provided a remotely controlled motile device system, comprising a remotely controlled motile device and a mobile smart device, comprising a data processor operatively connected to a memory, a camera, and a wireless transceiver, wherein the memory stores computer-readable instructions that, when executed by the data processor, cause the mobile smart device to capture images of the remotely controlled motile device, determine a pose of the remotely controlled motile device relative to the mobile smart device, and transmit commands via the wireless transceiver to the remotely controlled motile device to rotate the remotely controlled motile device to a set orientation relative to one of the position and the orientation of the mobile smart device.

The mobile smart device can comprise a user input interface, and the computer-readable instructions, when executed by the mobile smart device, can cause the mobile smart device to receive commands to translate the remotely controlled motile device via the user input interface and to transmit the commands to the remotely controlled motile device. The remotely controlled motile device can be a flying remotely controlled motile device.

The remotely controlled motile device can comprise at least three fiducial points, and the mobile smart device can determine the pose of the remotely controlled motile device using the at least three fiducial points.

The mobile smart device can comprise an orientation module for registering changes in the orientation of the mobile smart device.

The remotely controlled motile device can comprise an inertial measurement unit, the remotely controlled motile device can transmit inertial data captured via the inertial measurement unit to the mobile smart device, and execution of the computer-readable instructions can cause the mobile smart device to implement an inertial dead reckoning estimator that generates inertial pose estimates using the inertial data, and to determine the pose of the remotely controlled motile device by augmenting the visual pose estimates with the inertial pose estimates.

The user interface can comprise a control for launching and landing the remotely controlled motile device without further player intervention.

The flying remotely controlled motile device can hover stably without player intervention.

In a further aspect, an augmented reality game system is provided. The system includes (i) a mobile smart device, such as a smart phone, which includes a data processor operatively connected to a display screen, user input means, a camera and a wireless transceiver; (ii) a remotely controlled motile device (which may also be referred to as a drone), that is controlled via commands transmitted wirelessly by the mobile smart device; and (iii) an optical reference grid provisioned on a substrate, such as a mat. The mobile smart device is programmed to display an augmented environment in relation to the optical reference grid, and implement a visual pose estimator, which determines drone pose by processing one or more camera images of the drone in relation to the optical reference grid.

The optical reference grid can segment an area of the real environment into a plurality of visually discernible regions and provides a static reference set of fiducial points for the optical pose estimator.

The drone can include a plurality of LED lamps that provide a dynamic set of fiducial points, and the visual pose estimator can include a blob tracker which determines drone pose by detecting the LED lamps in relation to the static reference set of fiducial points.

The optical pose estimator can include a surface design tracker which determines drone pose based on the surface design of the drone in relation to the static reference set of fiducial points.

The drone can include an inertial measurement unit which transmits inertial data to the mobile smart device. The mobile smart device can be programmed to implement an inertial dead reckoning estimator which utilizes the inertial data, and the mobile smart device can determine drone pose by augmenting the visual pose estimates with inertial pose estimates.

The mobile smart device can be programmed to implement a drone controller capable of moving the drone to a designated spatial position. The drone controller can include a user interface which enables a player to designate a target position for the drone on the mobile smart device display screen.

The drone may be a flying device and the mobile smart device can be programmed to auto-rotate the drone such that it substantially always faces in a pre-determined direction (e.g., away from) relative to the mobile smart device. The user interface can include a control for launching and landing the drone without further player intervention. The drone control system can automatically control the flying drone to hover stably without player intervention.

In another aspect, a drone system is provided which includes: a mobile smart device, including a data processor operatively connected to a display screen, user input means, a camera and a wireless transceiver; and a remotely controlled drone, wherein the drone is controlled via commands transmitted wirelessly by the mobile smart device. The mobile smart device is programmed to implement a drone controller capable of moving the drone to a designated spatial position. The drone controller includes a user interface which shows the current position of the drone as viewed by the smart device camera and enables a player to designate a target position for the drone on the mobile smart device display screen.

In another aspect, a drone system is provided which includes a mobile smart device, including a data processor operatively connected to a display screen, user input means, a camera and a wireless transceiver; and a remotely controlled flying drone, wherein the drone is controlled via commands transmitted wirelessly by the mobile smart device. The mobile smart device is programmed to implement a drone controller capable of moving the drone. The drone controller includes a user interface having commands for translating the flying drone, and the drone controller auto-rotates the drone in flight such that it substantially always faces in a pre-determined direction (e.g., away from) relative to the mobile smart device.

In another aspect, an augmented reality game system is provided and includes a mobile smart device, including a data processor operatively connected to a display screen, user input means, a camera and a wireless transceiver, a remotely controlled motile device, wherein the remotely controlled motile device is controlled via commands transmitted wirelessly by the mobile smart device, wherein the remotely controlled motile device is transformable from a first form to a second form. The mobile smart device is programmed to display an augmented environment, and implement a visual pose estimator, which determines a pose by the remotely controlled motile device by processing one or more camera images of the remotely controlled motile device.

In yet another aspect, an augmented reality game system is provided, comprising a reference background comprising at least two static fiducial points, a remotely controlled motile device, a mobile computing device comprising a data processor operatively coupled to a display screen, a user input interface, a camera, a wireless transmitter, and a storage, the storage storing computer-readable instructions for implementing an augmented reality module that, when executed by the data processor, causes the data processor to detect a position of the remotely controlled motile device and the at least two static fiducial points of the reference background in actual image data captured by the camera, determine the position of the remotely controlled motile device relative to the at least two static fiducial points, generate augmented reality image data using the actual image data and the detected position of the at least two static fiducial points, present the augmented reality image data on the display screen, and transmit control commands to the remotely controlled motile device via the wireless transmitter.

A first subset of the control commands can be received via the user input interface. The user input interface can comprise a touchscreen overlaid on the display screen.

A second subset of the control commands can be generated by the augmented reality module.

The second subset can comprise a third subset of the control commands generated by the augmented reality module in response to interaction between the remotely controlled motile device and at least one augmented reality object. The interaction can comprise a collision between the remotely controlled motile device and the at least one augmented reality object.

The user input interface can comprise a touchscreen overlaid on the display screen, and the second subset can comprise a fourth subset of the control commands that is generated by the augmented reality module to move the remotely controlled motile device to a designated spatial position received via the touchscreen.

The remotely controlled motile device can be a flying device, and the second subset can comprise a fifth subset of the control commands that is generated by the augmented reality module to auto-rotate the remotely controlled motile device such that the remotely controlled motile device substantially always faces away from the mobile computing device.

The remotely controlled motile device is a flying device, and the second subset can comprise a sixth subset of the control commands that is generated by the augmented reality module to one of automatically launch and automatically land the remotely controlled motile device.

The remotely controlled motile device can be a flying device that hovers stably without player intervention.

The reference background can comprise at least one reference object.

The reference background can comprise a mat having surface decoration providing the at least two static fiducial points. The surface decoration can comprise a grid.

The remotely controlled motile device can be a ground-based device, the remotely controlled motile device can comprise at least one motile fiducial point, and the augmented reality module can comprise a pose estimator that determines a pose of the remotely controlled motile device by detecting a position of the at least one motile fiducial point relative to the at least two static fiducial points of the reference background. The at least one motile fiducial point can comprise a light-emitting diode.

The remotely controlled motile device can be a ground-based device, the remotely controlled motile device can comprise at least two motile fiducial points, and the augmented reality module can comprise a pose estimator that determines a pose of the remotely controlled motile device by detecting a position of the at least two motile fiducial points relative to the at least two static fiducial points of the reference background. The at least two motile fiducial points can comprise light-emitting diodes.

The reference background can comprise at least three of the static fiducial points, the remotely controlled motile device can be a flying device and comprise at least three motile fiducial points, and the augmented reality module can comprise a pose estimator that determines a pose of the remotely controlled motile device by detecting a position of the at least three motile fiducial points relative to the at least three static fiducial points of the reference background. The at least three motile fiducial points can comprise light-emitting diodes.

The remotely controlled motile device can comprise an inertial measurement unit and transmit inertial data generated by the inertial measurement unit to the mobile computing device, the mobile computing device can further comprise a wireless receiver for receiving the inertial data from the remotely controlled motile device, and the augmented reality module can determine a pose of the remotely controlled motile device using the position of the remotely controlled motile device relative to the at least two static fiducial points and the inertial data.

The augmented reality module can determine the pose of the remotely controlled motile device by augmenting the position of the remotely controlled motile device determined relative to the at least two static fiducial points with a dead reckoning estimation of the remotely controlled motile device generated from the inertial data.

BRIEF DESCRIPTIONS OF THE DRAWINGS

For a better understanding of the various embodiments described herein and to show more clearly how they may be carried into effect, reference will now be made, by way of example only, to the accompanying drawings in which:

FIGS. 11A and 11B are perspective views of remotely controlled motile devices in accordance with yet another embodiment that transforms, and is in the form of a ground-based vehicle and in the form of a legged entity that is a robot, respectively;

FIGS. 12A and 12B are perspective views of a remotely controlled motile device in accordance with yet another embodiment that transforms, and is in the form of a ground-based vehicle and in the form of a legged entity that is an animal, respectively;

DETAILED DESCRIPTION

Figure 1:
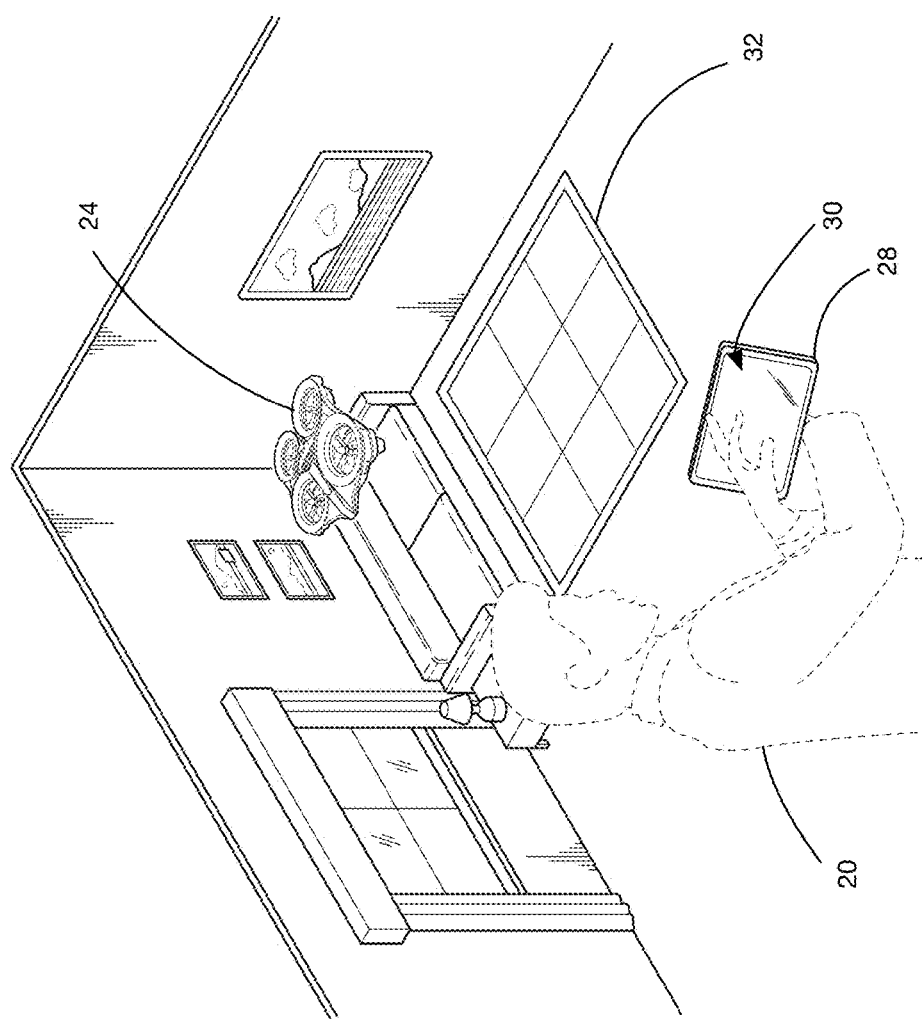
FIG. 1 is a perspective view of components employed to play an augmented reality game in accordance with an embodiment of the present disclosure.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

Augmented reality games in various embodiments as described herein employ a remotely controlled motile device in combination with a video game. The remotely controlled motile device may be, for example, an aerial vehicle such as a toy quadcopter, commonly referred to as a drone, or a helicopter. The remotely controlled motile device may alternatively be a ground-based vehicle such as a tracked vehicle, such as a tank, or a wheeled vehicle such as a car, a truck, a bus, a train, motorcycle, a bicycle, or any other suitable wheeled vehicle. Alternatively, the remotely controlled motile device may be in the form of a wheeled device that is not considered a vehicle, such as a wheeled character that resembles an animal, a robot or a human. As yet another alternative, the remotely controlled motile device may be in the form of a non-wheeled device such as a legged character that resembles an animal, a robot or a human. In still yet another alternative, the remotely controlled motile device may navigate through a fluid, such as a tank of water. In general, the remotely controlled motile device may be any device that is remotely controlled and is able to move within an environment.

Players control the remotely controlled motile device while engaging in missions and completing goals in the companion video game. The virtual environment of the video game is projected in augmented reality through a display screen of a mobile computing device, such as a smart phone or tablet. The remotely controlled motile device interacts with the augmented (real and virtual) environment, for example to move to different locations in physical space whilst shooting virtual aliens, putting out virtual fires and rescuing virtual people.

FIG. 1 shows the major elements of the augmented reality game in accordance with an embodiment. The game is played within a real environment, illustrated as a living room in FIG. 1, although any physical environment is possible (provided it is conducive to image processing requirements as discussed in greater detail below). A player 20 controls a drone 24 through a tablet 28 having a touch screen 30 that both displays images and video, and enables player input. While in this embodiment, a tablet is used, a smart phone or any other such 'mobile smart device' having a data processor, a memory storing computer-readable instructions for providing the functionality described herein, a display screen, a user input interface such as keyboard, a D-pad, a joy stick, or a touch screen, a forward facing camera, and wireless communication capability such as Bluetooth (BLE) which enables the mobile smart device to communicate with the drone. Further, the mobile smart device can include an orientation module for determining the orientation of the mobile smart device. In addition, a game mat 32 is provisioned which provides an odometry reference in that it incorporates an optical reference grid, as discussed in greater detail below.

Figure 2:
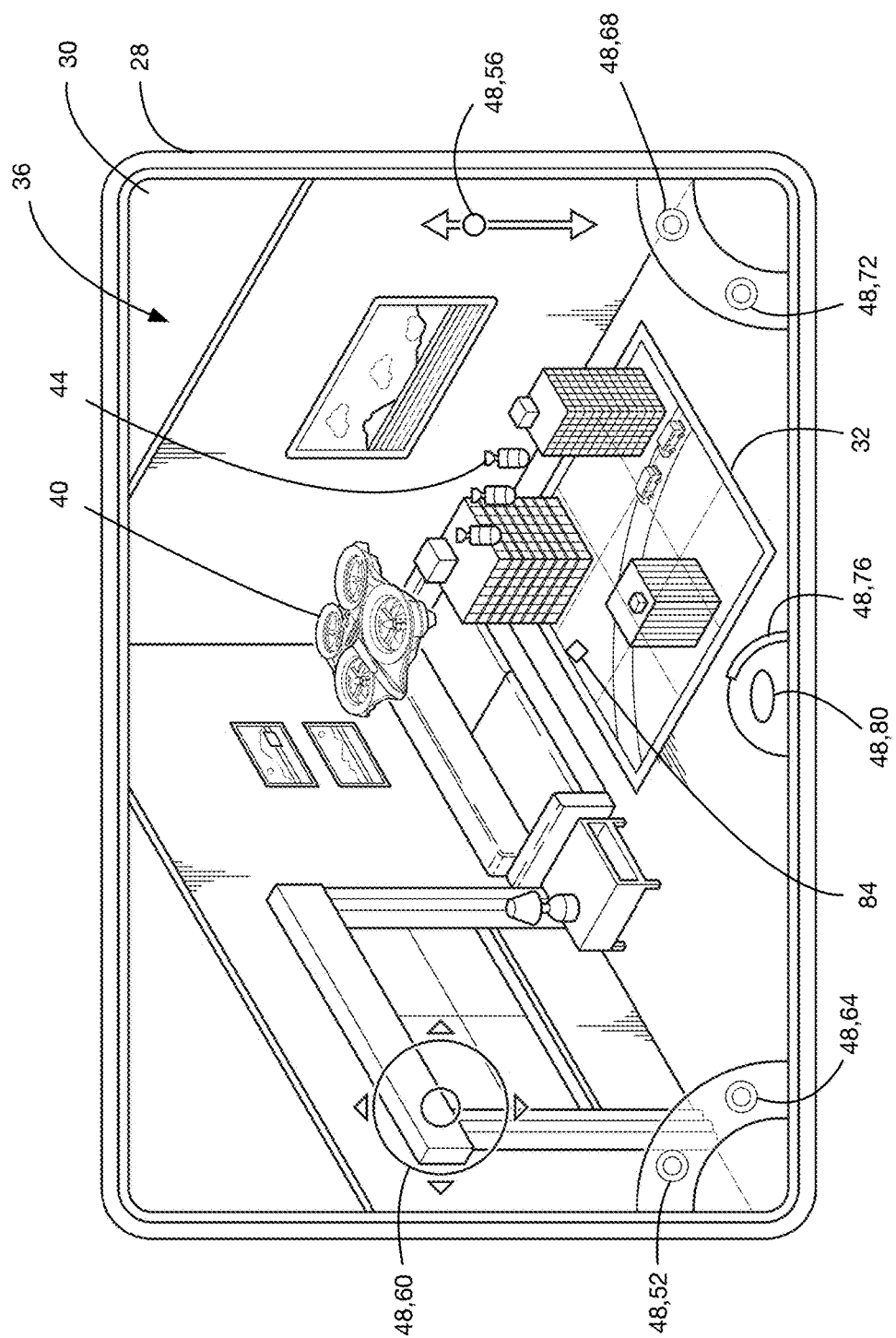
FIG. 2 is an image displayed on a mobile computing device used during the augmented reality game.

FIG. 2 shows a screen shot 36 of the touch screen 30 of the tablet 28 that is presented to the player 20 while he is controlling the drone 24 via the game. The screen shot 36 shows the real environment as viewed by a front facing camera of the tablet 28. The screen shot 36 also displays a virtual environment (comprising, in this illustration, images of buildings, landscape and vehicles), which is provisioned as a three-dimensional projection overlaid on the real environment image using the game mat 32 as a frame of reference. A drone image 40 of the real drone is displayed, along with virtual projectiles 44 emanating therefrom. In addition, game informational and control graphics 48 are overlaid by the tablet 28 over the images of the real and virtual environments. While, in the illustrated scenario, the virtual environment is constructed directly atop of the mat 32, the mat 32 simply acts as a frame of reference and the virtual environment can extend beyond the lateral borders of the game mat 32, or can be smaller than the game mat 32. Further, the virtual environment can also extend "below" the mat or other reference background in some scenarios.

The game control and informational graphics may vary depending on the particular design of the augmented reality game. In the embodiment shown in FIG. 2, the control and informational graphics 48 relate to real control of the drone 24 and interaction with the virtual environment. More particularly, the game control and informational graphics 48 in FIG. 2 include:

- Take Off/Land Virtual Button 52—when pressed causes a grounded drone to take off to a pre-designated position or causes the flying drone to land at a pre-designated position
- Elevation Virtual Joystick 56—sets the elevation of the flying drone
- Planar Coordinate Virtual Joystick 60—sets the planar position of the flying drone
- Bomb Release Virtual Button 64—shoots virtual bombs from the flying drone
- Water Cannon Virtual Button 68—shoots a virtual water cannon from the flying drone (to put out fires started by ravaging aliens)
- Grapple Virtual Button 72—extends and operates a virtual grappling hook from the flying drone (to save bystanders and capture aliens)
- Battery Life Meter 76—shows the remaining life of the drone's onboard battery
- Session Timer/Menu Button 80—shows the time remaining in the current game play session or level 2.0 Control UI For the purposes of game play, it is desirable that a flying drone be easy to control, particularly for younger children, so that the player's attention is focused on the game as opposed to the mechanics of flying the drone. To this end, a number of improvements may be provisioned in the control user interface and corresponding automated controls which reduce the complexity of controlling the flying drone.

First, the drone control system preferably employs an embedded controller which stabilizes hover so that the player does not have to worry about trimming the controls in order to respond to external influences such as wind, air density, battery level and the like. Short of equipping the flying drone with infrared or sonic range-finding sensors, it has hitherto been difficult to implement an extremely stable hover for flying drones. The stable hover is made possible in part through reliable optical tracking of drone position, as discussed in greater detail below. Described further below, in some embodiments, steps carried out that permit a stable hover relative to a fixed frame of reference are: 1) determining the absolute position of the frame of reference relative to the smart device (via optical tracking of the mat or other analogous fixed reference item), 2) determining the absolute position of the drone relative to the smart device (via tracking of the LEDs and fiducial decoration), 3) calculating the absolute position of the drone relative to the frame of reference, and 4) communicating control commands to the drone to keep its position static relative to that frame.

Second, the flying drone is displayed in its augmented environment by the touch screen 30 of the tablet 28 which includes virtual controls for flying the drone. To this end, the drone control system orients the flying drone 24 so that it substantially always faces away from the tablet 28 and, thus, generally away from the player 20 holding the tablet 28. This enables the virtual controls for the flying drone 24 to substantially always retain their effective orientation relative to the player when the player is looking directly at the flying drone 24, thus providing so-called 'headless' control. For example, the flying drone 24 may be controlled via the Elevation Virtual Joystick and the Planar Coordinate Virtual Joystick as shown in FIG. 2. By keeping the orientation of the flying drone 24 relative to the position of the tablet 28 constant, the 'left' and 'right' directions of the Planar Coordinate Virtual Joystick 60 will always move the flying drone 24 to the left and right, relative to the tablet 28 and thus to the player 20 holding the tablet 28, making it easier and more intuitive to control the flying drone 24 for younger players.

It should also be appreciated that in the embodiment shown in FIG. 2, there are no virtual controls for rotating the flying drone 24, only for translating it (i.e., left, right, front, rear, up, down). In reality, the flying drone 24 will necessarily rotate in order to move from point to point and keep its orientation facing away from the tablet 28, but this detail is automatically handled by the drone control system, making it easier and more intuitive to control the flying drone 24 for younger players.

Third, in order to further enhance game play, the flying drone control system preferably also includes an end or target position control mode. In this mode, the player 20 identifies an end position to which the player 20 wishes to move the flying drone 24, and the control system automatically takes care of flying the flying drone 24 to the indicated position.

In some embodiments, the target position control may be implemented by the player simply pressing and holding on the drone image 40 on the touch screen 30 of the tablet 28, at which point a duplicate ghost image of the flying drone is presented to the player 20 who can then move the ghost image to the target position.

Additionally or alternatively, in some embodiments, the target position control may be accomplished via the Elevation Virtual Joystick 56 and the Planar Coordinate Virtual Joystick 60, as seen in FIG. 2. In normal mode, these virtual joysticks are substantially real time controls in that the interaction with these virtual controls causes corresponding directional movement of the flying drone 24. However, in the target position control mode, these joysticks may control a drone target position cursor 84 (shown as a diamond in FIG. 2 but may be any desired graphic including a duplicate or ghost image of the flying drone) which may be manipulated to point to the desired target position, following which the drone control system moves the flying drone 24 to the target position.

The target position can be identified as a location in two or three-dimensional space. The target position can be specified in two-dimensional space, for example, by touching or otherwise identifying a location on or relative to the mat 32. The target position is mapped to x and y coordinates determined in relation to the mat 32, and may refer to a location at a surface of the mat 32 or above it. For example, in the case of the flying drone 24, the target position may correspond to a position at the current elevation of the flying drone 24, but having the x and y coordinates determined in relation to the mat (that is, the target position may be directly above the identified spot on the mat 32 at the current altitude of the flying drone 24), so that the location of the flying drone 24 is to be translated laterally (i.e., left or right) and/or longitudinally (i.e., forwards or backwards) to arrive at the target position. Alternatively, the target position in some scenarios can be the location identified on the surface of the mat 32, so that navigation of the flying drone 24 to the target position may require a reduction in altitude of the flying drone 24. This is particularly the case where the remotely controlled motile device is a ground-based vehicle.

Alternatively, upon selecting a target position mode, an opaque or grid virtual horizontal plane can be presented on the touch screen 30 that a player can control the elevation of, such as via the Elevation Virtual Joystick 56. Then, upon touching a location on the touch screen 30, the tablet 28 can set the target position to the x and y coordinates of the selected location on the horizontal plane and use the elevation of the horizontal plane for the z coordinate of the target position, thus enabling a player to explicitly specify a particular target position in three-dimensional space.

In a further embodiment, the tablet 28 can set the center of the viewing region of the back camera thereof as a target position, while maintaining its current altitude. Then, as the tablet 28 is rotated or otherwise moved, the tablet 28 can generate and send commands to the flying drone 24 to cause the flying drone 24 to move to maintain its position in the center of the viewing region, as presented on the touch screen 30 of the tablet 28. In this mode, control of the flying drone 24 is greatly simplified as a player merely has to reorient and/or reposition the tablet 28 in order to cause the flying drone 24 to move to the newly-located center of the viewing region.

In navigating the flying drone 24, the tablet 28 can be configured to either directly travel to the target position, or to select a travel path for the flying drone 24 that avoids obstacles, either real or virtual. Thus, the flying drone 24 may navigate around a tall building in the augmented environment.

3.0 Drone Positioning Sub-System

Although the line between toy and hobby is quite blurred, toys are typically intended for younger children and the mass consumer market. Cost is important for the toy market. To this end, the cost of the augmented game reality system described herein is limited by enabling use of widely adopted mobile smart devices that do not need to be specially purchased for game use as well as limiting the cost of the drone. For example, non-essential sensors such as the on-board camera and expensive circuitry can be omitted from the employed drone. Instead, the camera required to control the drone is included in the mobile smart device and it also provides the primary data processing capability needed to track the spatial position and orientation (pose) of the drone in order to direct it.

To reduce circuitry costs, the drone positioning system utilizes an optical tracking system supplemented by drone inertial telemetry. As discussed in greater detail below, the optical tracking system is reasonably accurate in determining the drone's pose in the real environment relative to the mobile smart device. The optical tracking system is relatively computationally intensive and preferably executed on a graphics processor unit (GPU) of the mobile smart device.

3.1 Optical Tracking System

In the example discussed herein, the optical tracking system utilizes two visual pose estimators: (i) a blob tracker, and (ii) a surface design tracker. Each tracker uses two sets of fiducial points for determining drone pose (spatial position and orientation), one set providing a fixed reference and the other set providing a dynamic reference. In both trackers, the fixed reference of fiducial points is provided by the optical reference grid of the mat 32. In the blob tracker, the dynamic set of fiducial points are provided by optical locating features on the drone 24 such as LED lamps. In the surface design tracker, the dynamic set of fiducial points are provided by surface designs on the drone 24.

3.1.1 Optical Reference Grid

Figure 3:
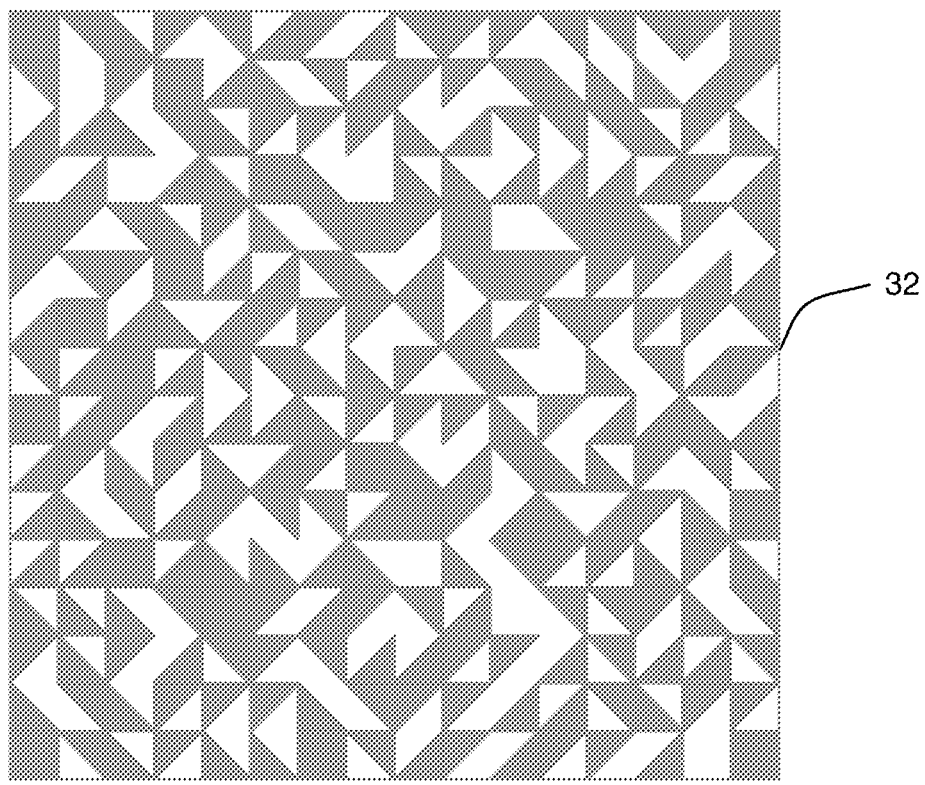
FIG. 3 is an exemplary reference background that may be provided by an exemplary reference object, a mat, that is among the components shown in FIG. 1.

The optical reference grid of the mat 32 preferably has a distinct pattern which, when segmented and processed, allows for its position to be determined in the real environment preferably without the need for active lighting control, thus enabling the virtual environment to be projected relative thereto. The optical reference grid of the mat 32 provides a fixed reference for the pose of the flying drone 24. An example of an optical reference grid is shown in FIG. 3. Of course, the optical reference grid need not be provided in the form of a mat per se. It can be provisioned by markings on any surface such as a board, floor, table or a three-dimensional construct such as a game landscape or mountain. In some cases, two or more smaller mats can be employed and their relative location can be determined during a calibration process. Additionally or alternatively, active or passive illumination either visible or invisible, can provide a reference background, such as LED beacons, infrared light beacons, retro-reflective objects, etc. All that is required is a pre-determined pattern with sufficient resolution and visual distinctiveness relative to the real background environment so to provision a set of fiducial points or coordinate system. Where the pattern is not previously known to the optical tracking system, the pattern may be determined by calibration process performed prior to playing the game. A mobile smart device can then use an approach such as simultaneous localization and mapping ("SLAM") for constructing a map of an environment and determining its location within it.

3.1.2 Blob Fiducial Points

Figure 4:
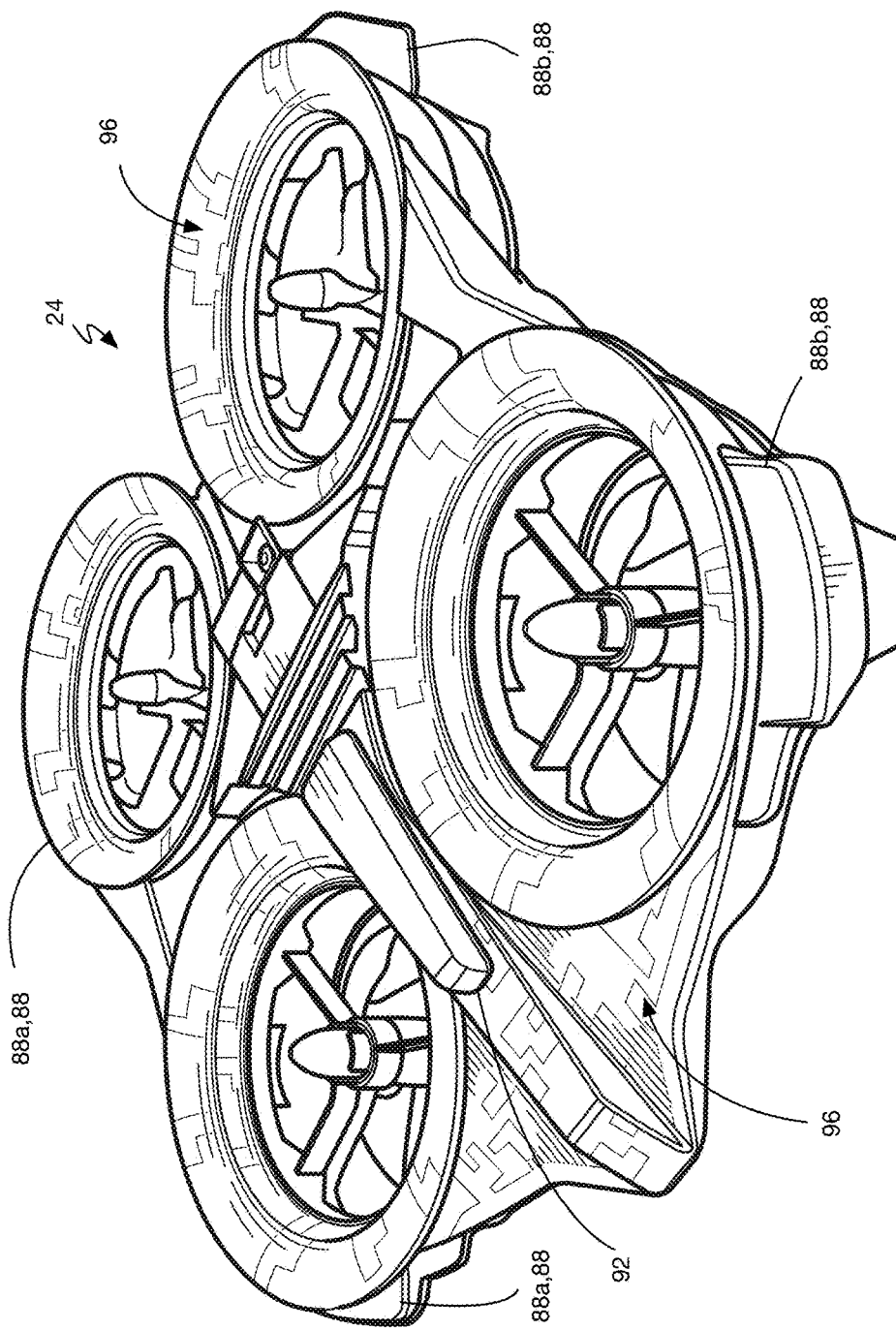
FIG. 4 is a perspective view of an exemplary remotely controlled motile device, namely a flying drone, that is among the components shown in FIG. 1.

There are preferably at least three fiducial blobs, and more preferably five such blobs, on the drone. The fiducial blobs can be any regions on the flying drone 24 that are visually distinct such that they can be discriminated against the background of the drone and/or the real environment. LED lamps, comprising LEDs mounted behind diffusers, are well suited for this task as they can provide a visually distinct substantially constant region of color. In the embodiment of the drone shown in FIG. 4, there are four LED lamps 88. Two of the LED lamps 88a are of a first color (e.g., blue), and the other two LED lamps 88b are of a second color (e.g., green). Due to the arrangement of the adjacently colored LED lamps 88a and 88b, by viewing two of the LED lamps, the general orientation of the flying drone 24 about a vertical axis (i.e., the direction it is facing) can be readily determined. An RGB LED lamp 92, whose color is controllable, is helpful to confirm the pose of the flying drone 24 as it is asymmetrically positioned on the surface of the flying drone 24. The LED lamps 88, 92 have a raised profile so that they are readily visible from the side. Further, the RGB LED lamp 92 has a shape and dimensions that differ from the shape and dimensions of the other LED lamps 88 to facilitate its identification. The LED lamps 88, 92 are preferably mounted in an asymmetrical pattern to aid in pose recognition and preferably the intensity of the LED lamps 88, 92 can be controlled to adjust for ambient lighting conditions. As long as three of the LED lamps 88, 92 can be seen by the camera of the tablet 28, the pose of the flying drone 24 can be determined.

3.1.3 Surface Design Fiducial Points

The flying drone 24 has a surface design with numerous sharp edges therein. The sharp edges are processed through edge or corner detectors and the like that enable the surface design tracker to derive fiducial reference points. Preferably each motor nacelle has a somewhat different surface design pattern so that the surface design tracker can more easily identify different regions of the flying drone 24. Further, the flying drone 24 has surface decoration 96, such as decals or paint, that are readily optically registrable to facilitate the determination of its pose.

3.2 Optical Processing

The visual pose estimators operate relative to a coordinate system defined by the optical reference grid. The blob tracker is the primary pose estimator and its results are combined with those of the surface design tracker and the IMU telemetry. The weighting of the three approaches is based on a tracking quality indicator largely derived from the overall feature reprojection error of the surface design tracker. When the surface design tracker yields substantially different results than the IMU telemetry, the pose estimate derived from the surface design tracker may be ignored. In other embodiments, the pose estimate may be generated in other ways, such as the combination of the poses from two of the trackers, a serial processing via the various trackers of the pose, etc.

Figure 5:
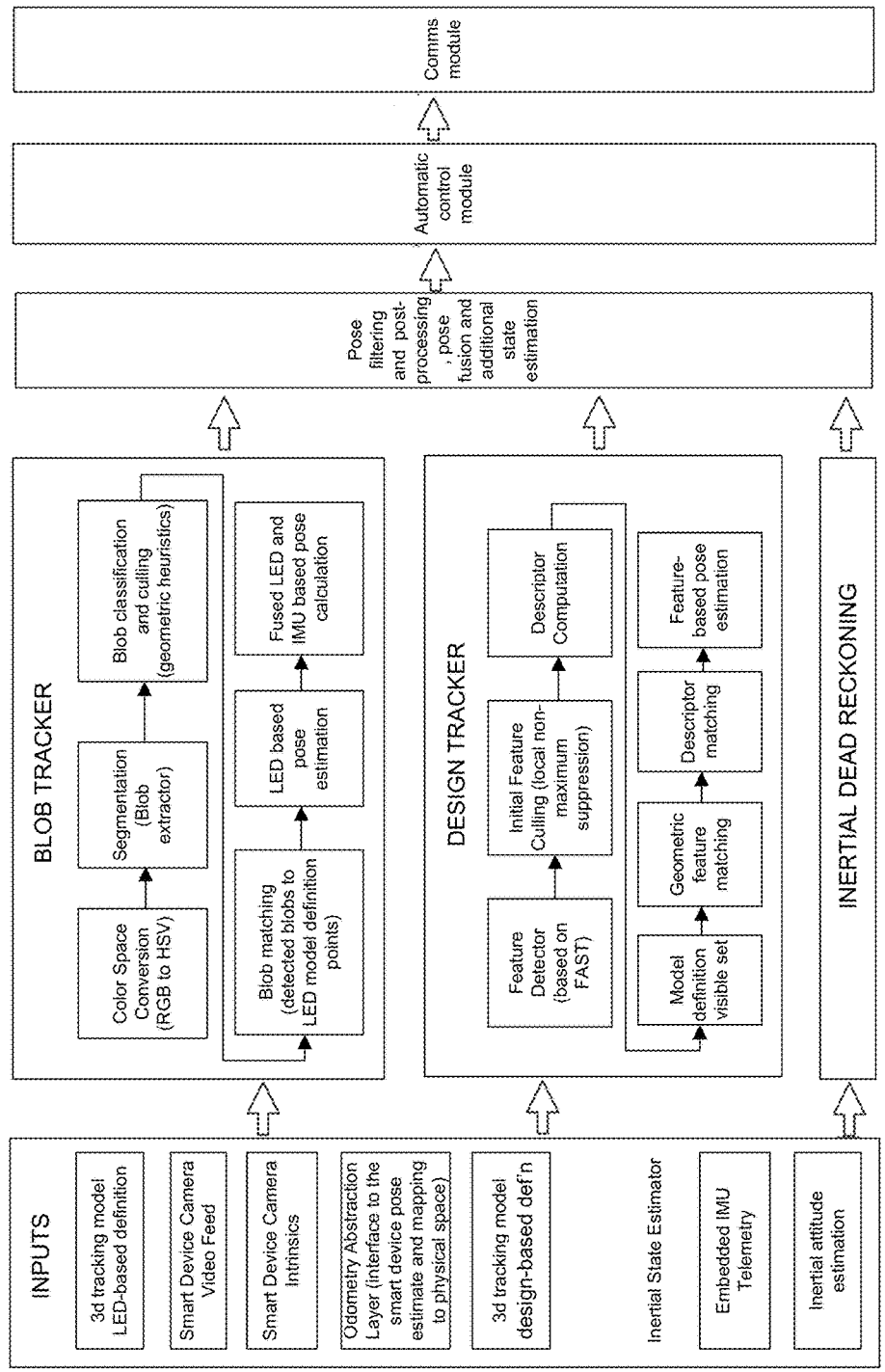
FIG. 5 is a modular block diagram of a drone control system executing on the tablet of FIG. 1.

FIG. 5 shows a system block diagram for the flying drone control system executing on the tablet 28.

3.2.1 Inputs

The inputs to the visual pose estimators include:

- a reference spatial model of the LED lamp fiducial blobs
- a reference spatial model of the surface design fiducial points
- video feed from the camera of the mobile smart device
- camera optical properties data, which enables the control system to convert screen pixel points of images captured by the camera of a mobile smart device to real space
- an odometry abstraction layer, which provides coordinate transform services to convert points in screen pixel space to points in real space and vice versa

3.2.2 Blob Tracker Visual Pose Estimator

The blob tracker receives successive images from the camera of the mobile smart device and in a first processing step or module converts the RGB (red, green, blue) color space to HSV (hue, saturation and value) camera space as the latter is more conducive to detecting color thresholds.

This module can preferably also set camera exposure and white balance to ensure that the LED lamps 88, 92 do not appear over/under exposed. An auto-calibration algorithm identifies the optimal exposure, white balance, and HSV thresholds. The algorithm is based on iterative linear optimization of the individual calibration parameters, aiming to obtain the largest blob size and the best "compactness" (clean contours and no holes in the detected blobs). Since a minimum contrast and exposure, are also required the module can preferably also dim or brighten the LED lamps 88, 92 as necessary to strike the best balance with the requirements of the other trackers.

After color conversion, the image is then processed to segment, classify and match blobs against the known model. More particularly, the segmentation step or module seeks to detect regions in the digital image in which some properties are constant or approximately constant to one another and that differ in properties, such as brightness or color, compared to surrounding regions. The classification and culling step or module classifies blobs, for example, to ascertain if they have the expected shapes and colors of the LED lamps 88, 92, including spatial and temporal coherency, as well as culls those blobs that are superfluous. The matching step or module then matches remaining blobs against the LED lamp reference spatial model, based in part on the colors of the blobs and the distances between them.

Once the position of the tracking points has been identified, a pose estimator module estimates the pose of the flying drone 24 using mathematical equations comparing its position relative to the optical reference grid of the mat 32. Such equations will be known and understood by those skilled in the art.

To increase the reliability of pose estimation, a random sample consensus algorithm (RANSAC) can be used to iterate through combinations of the selected blobs until the reprojection error using the estimated pose is below a set threshold (determined empirically). Each RANSAC iteration can use an iterative pose estimation (POSIT) algorithm, which calculates the pose of a 3D rigid object from its projection on a single image. The algorithm estimates the pose by first approximating the perspective projection as a scaled orthographic projection, and then iteratively refining the estimation until the distance between the projected points and the ones obtained with the estimated pose falls below a threshold.

3.2.2 Surface Decorative Visual Pose Estimator

In a first step, the surface design tracker processes the camera image through a corner detector such as provided by features from accelerated segment test (FAST) algorithm originally developed by Rosten and Drummond.

An Initial Feature Culling module reduces the number of extracted features and minimizes the number of outliers, reducing the computational overhead of later stages. The main mechanisms are local maximum suppression (which picks the features with the best response within an area around each pixel) and ANMS—Adaptive Non-Maximum Suppression (which attempts to keep features that fit to a certain distribution)

A Descriptor Computation module uses descriptors associated with each feature to uniquely characterize the feature and make it identifiable under different image transformations and lighting conditions. The ORB descriptor used is described here: https://www.willowgarage.com/sites/default/files/orb_final.pdf A Model Definition Visible Set module, given an initial pose estimate for the flying drone 24, determines the features that should be visible from the current camera point of view. This avoids trying to match features that are not potentially visible (e.g. matching underbelly features in an upright flying drone 24 orientation). This step only occurs when an estimate from the blob tracker is available, otherwise the pipeline progresses directly to descriptor matching with the entire model set. This step minimizes outliers and reduces computational overhead for the descriptor matching and pose estimation steps.

A Geometric feature matching module matches features from the model definition (i.e., corner features that characterize the shape and decoration of the flying drone 24) reprojected using the initial pose estimate form the blob tracker with the features extracted from the image. The matching is based on Euclidean distance.

A Descriptor matching module compares features that have passed the geometric matching step for similarity in their associated descriptors. The matching is based on the Hamming distance between descriptors.

The surface design tracker does not function as a stand-alone tracker (at least it is not intended to), but rather takes the pose estimate from the blob tracker and does feature matching based on the feature point reprojections. This ensures very fast and accurate matching. A refined pose estimate is computed using all the successfully matched points through a Perspective-n-Point algorithm.

3.3 IMU Telemetry

Figure 6:
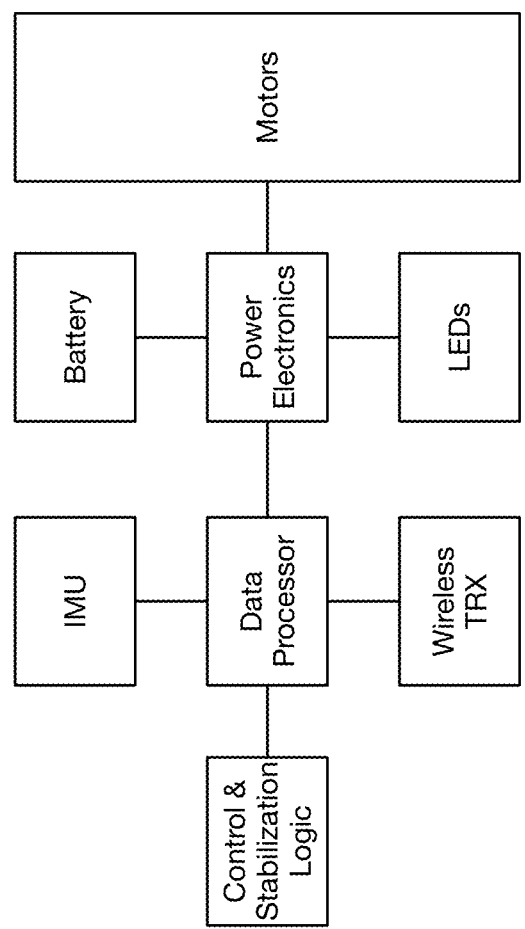
FIG. 6 is a system block diagram of the drone shown in FIG. 4.

A system block diagram for a remotely controlled motile device is shown in FIG. 6. The flying drone 24 includes an inertial measurement unit (IMU). The IMU data may vary for different types of remotely controlled motile devices. For example, a wheeled drone can have a three-axis accelerometer. A flying drone such as the flying drone 24 may additionally have a gyroscope and/or altimeter. The IMU telemetry data is transmitted to the tablet 28 using the on-board transceiver.

The IMU telemetry data can be used to augment the drone pose determined by the visual pose estimators based on the principle of dead reckoning, in which a known position is advanced based upon known or estimated speeds over elapsed time and course.

To this end, the flying drone control system includes an inertial dead reckoning module which receives gyroscope and/or accelerometer data from the flying drone 24 that is processed to provide rotational velocity in three axes and linear acceleration in three axes. Each axis is integrated to give its rotation and orientation. Likewise, IMU altitude readings are provided to the dead reckoning module.

As discussed previously, the inertial data can be used to advance the pose estimate provided by the visual estimators, for example, in between pose estimates made by the visual pose estimators, function as a confirmatory check on the visual pose estimates, or be fused together with the pose estimates generated by the visual pose estimators. The pose estimate fusion is carried out by the pose fusion module.

4.0 Automatic Control System

Figure 7:
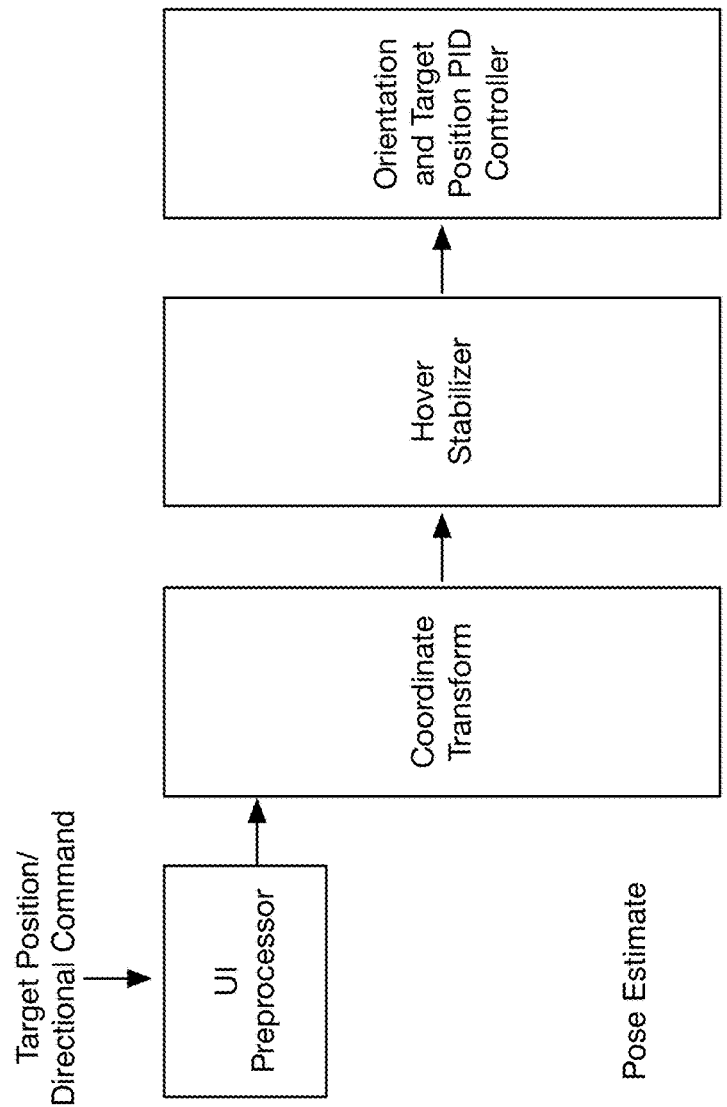
FIG. 7 is a modular block diagram view of an automatic control module in the drone control system.

A more detailed block diagram view of the automatic control module is shown in FIG. 7. The automatic control module receives a drone target position or a directional command (such as 'move left' or 'move down') from the user interface. When a drone target position is received, it is preprocessed to convert it to a three-dimensional target position. For the purposes of this disclosure, the term target position will include an abstracted directional command since the latter can in effect be converted into a position command by the automatic control module.

The target position as well as the current pose estimate generated by the pose fusion module is used to control the motors of the flying drone. More particularly, the target position and the current pose estimate are processed by a coordinate transform module which transforms positions in screen pixel space to positions in real space.

Successive target positions are compared in a hover stabilizer module that determines if the flying drone has not been directed to move, in which case it is commanded to hover. In this case, the hover stabilizer compares the target position with the current pose estimate to correct for any small changes in pose due to external influences such as wind. The target position and current pose estimates are fed to an orientation and target position proportional, integral, derivate (PID) controller, as known in the art per se, which provides drone controls commands (such as throttle, pitch, roll and yaw commands) for transmission to the flying drone 24 via the RC link.

The maintenance of a remotely controlled motile device in a set orientation relative to the position of a mobile smart device is achieved in one of a few manners. In the above embodiment, a remotely controlled motile device is maintained in a set orientation relative to the position of a mobile smart device by directly determining the relative orientation of the remotely controlled motile device in images captured by the mobile smart device. That is, images captured by the front camera of the mobile smart device are processed by the optical tracking system to identify a pose of the mobile smart device relative to the position of the mobile smart device. An orientation difference in the x-y plane of the remotely controlled motile device, ignoring the z axis (elevation), is then corrected by automatically generating and transmitting commands to the remotely controlled motile device to reorient it to the set orientation relative to the mobile smart device in the x-y plane. That is, the mobile smart device determines and sends commands to the remotely controlled motile device so that the "rear" of the remotely controlled motile device always faces towards the mobile smart device.

In another embodiment, the mobile smart device can direct the flying drone 24 to maintain the same orientation as the mobile smart device. That is, if the back of the mobile smart device, and the back camera of the mobile smart device, is facing north, for example, the mobile smart device can direct the flying drone 24 to also face north, independent of its position relative to the mobile smart device. In this embodiment, a remotely controlled motile device is maintained in a set orientation (e.g., facing in the same direction as the front camera in the horizontal x-y plane and ignoring any elevational inclination along the z axis) relative to a mobile smart device by directly determining the relative orientation of the remotely controlled motile device relative to that of the mobile smart device. That is, images captured by the front camera of the mobile smart device are processed by the optical tracking system to identify a pose of the mobile smart device relative to a central line-of-sight axis of the front camera (that is, an axis that is perpendicular to the mobile smart device), as is described above. A relative pose difference in the x-y plane is then corrected by automatically generating and transmitting commands to the remotely controlled motile device to reorient it to the set orientation relative to the orientation of the mobile smart device in the x-y plane.

The mobile smart device can include an orientation module for determining its orientation. Additionally, the remotely controlled motile device can also include an orientation module, such as one employing an inertial motion unit, for determining its orientation and location, and transmit its orientation and location to the mobile smart device. The mobile smart device can compare its orientation to that of the remotely controlled motile device, and automatically generate and transmit commands to the remotely controlled motile device to reorient it to the set orientation relative to the mobile smart device in the x-y plane.

While in the scenario of a flying drone, it is desirable to maintain its generally horizontal disposition so that it can effectively maintain lift to remain in the air, it can be desirable in other scenarios to fully orient the remotely controlled motile device in a set pose relative to the mobile smart device in three dimensions. For example, where the remotely controlled motile device is a submersible, water-based device, it may be possible to orient the submersible, water-based device in the same orientation in three dimensions as the mobile smart device. This may also be possible with flying drones where it is possible to reorient the propellers so that the orientation of a chassis of the flying drone may effectively be rotated through three dimensions.

5.0 Non-Flying Drones

While the remotely controlled motile device has been shown in FIG. 1 as a flying drone 24, it will be understood that other types of remotely controlled motile devices may be employed.

5.1 Drone as Ground-Based Vehicle

Figure 8:
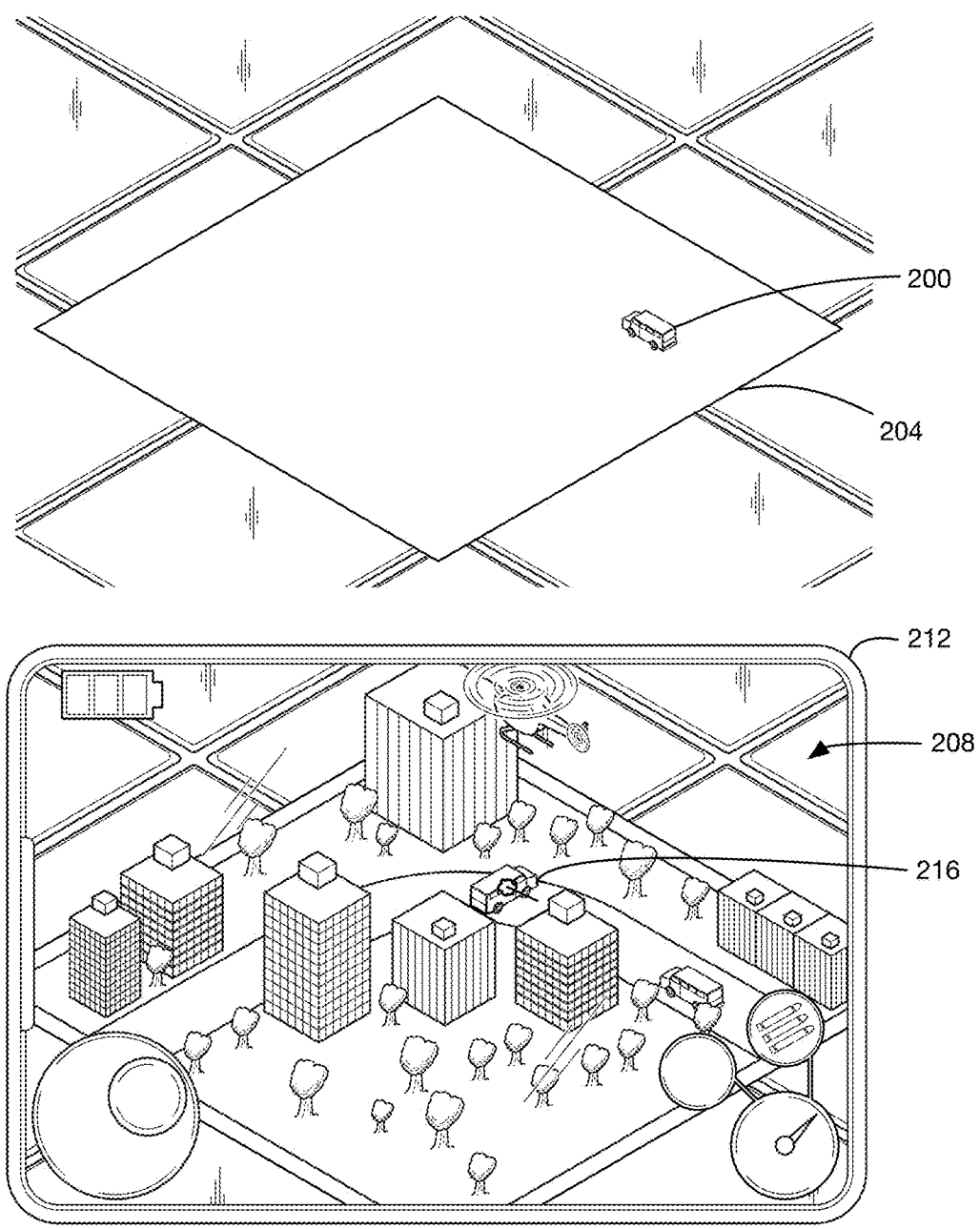
FIG. 8 is a perspective view of components employed to play an augmented reality game in accordance with another embodiment of the present disclosure, wherein the remotely controlled motile device is a ground-based vehicle.

Reference is made to FIG. 8, which shows an alternative embodiment of the system shown in FIG. 1. In the embodiment shown in FIG. 8, the remotely controlled motile device is a ground-based vehicle 200. A mat 204 is in this example, again provided as an optical reference structure. In FIG. 8, the ground-based vehicle 200 is driven on the mat 204 and an augmented reality environment in the form of a racing course through a city is overlaid atop of the mat 204 on a touch screen 208 of a mobile smart device 212. The round-based vehicle 200 is represented onscreen in the augmented reality image as having working headlights and some firepower which is being used to disable a competing vehicle 216.

In the embodiment shown in FIG. 8, the remotely controlled motile device is a car, however, it could alternatively be any other suitable ground-based vehicle as described earlier.

It will be understood that, in the embodiment shown in FIG. 8, there may not be a need to determine the altitude of the remotely controlled motile device in situations where the remotely controlled motile device will always be at the same elevation, such as where the reference structure is a mat and the remotely controlled motile device is a ground-based vehicle.

Figure 9:
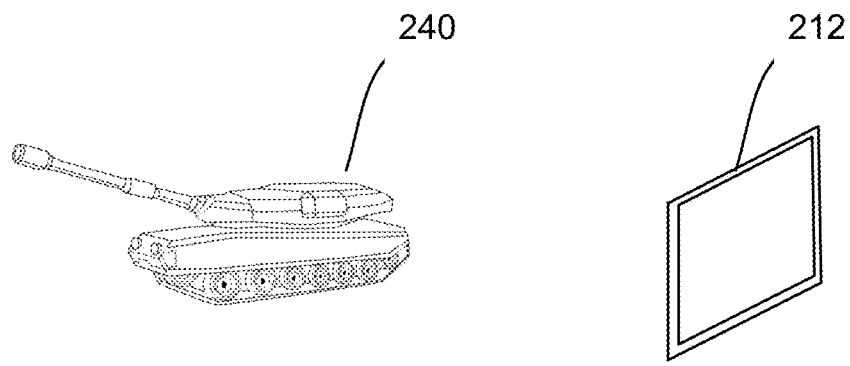
FIG. 9 is a perspective view of a remotely controlled motile device in accordance with a further embodiment that is a tracked vehicle.
Figure 10:
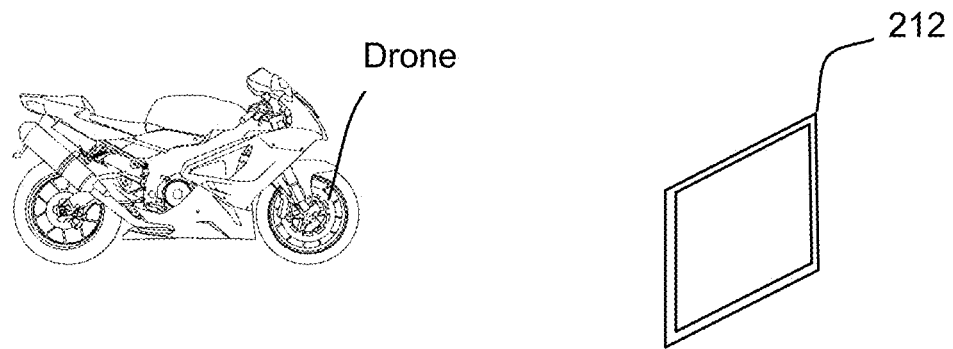
FIG. 10 is a perspective view of a remotely controlled motile device in accordance with yet another embodiment that is a motorcycle.

In the embodiment in FIG. 9, the remotely controlled motile device is a tank 240. In the embodiment shown in FIG. 10, the remotely controlled motile device is a motorcycle 260.

5.2 Drone as Transforming Device

The remotely controlled motile device need not have a fixed form. For example, in the embodiment shown in FIGS. 11A and 11B and in FIGS. 12A and 12B, the remotely controlled motile device is transformable from one form to another form. In the examples shown in FIGS. 11A and 11B and FIGS. 12A and 12B, the remotely controlled motile device is a transforming car 300 that transforms from a first form 300a which is a ground-based vehicle to a second form 300b which is a legged entity. For greater certainty, it will be understood that in any embodiment in which the remotely controlled motile device is a robot or is a robot when in one form, the robot need not have a humanoid configuration. The robot could be in the form of a robotic quadruped, for example. Additionally, the robot need not be ambulatory. For example, the robot could be provided with a tracked system and wheels on its legs.

In the example shown in FIGS. 12A and 12B, the remotely controlled motile device is a transforming car 340 that transforms from a first form 340a which is a ground-based vehicle to the second form 340b of the remotely controlled motile device is an animal although it could be any other suitable character. In the example shown in FIGS. 11A and 11B, the remotely controlled motile device 300 is wheeled in the first form 300a and is not wheeled in the second form 300b. In the second form, the remotely controlled motile device could be ambulatory (i.e. the device can walk). In the example shown in FIGS. 12A and 12B, the remotely controlled motile device 340 is wheeled in both the first and second forms 340a, 340b.

In the example shown in FIGS. 11a and 11b, the remotely controlled motile device has some fiducial points 304a that remain in the same positions relative to one another when the remotely controlled motile device is in the first and second form, and other fiducial points 304b that change positions relative to each other. The system may use the positional relationships of the fiducial points 304a, 304b to determine which form the remotely controlled motile device 300 is in and may represent the remotely controlled motile device 300 in whichever of the two different forms is appropriate based on the detected positions of the fiducial points 304a, 304b.

In the example shown in FIGS. 12a and 12b, the remotely controlled motile device 340 has fiducial points 344 that remain in the same positions relative to one another when the remotely controlled motile device is in the first and second forms 340a, 340b. In such an example, the system may not be able to use the positional relationships of the fiducial points 344 to determine which form the remotely controlled motile device is in. Accordingly, the system may use other means for detecting which form the remotely controlled motile device is in, such as by optical recognition of the surface design (shape of the configuration, in this case) of the remotely controlled motile device 340.

Figure 13:
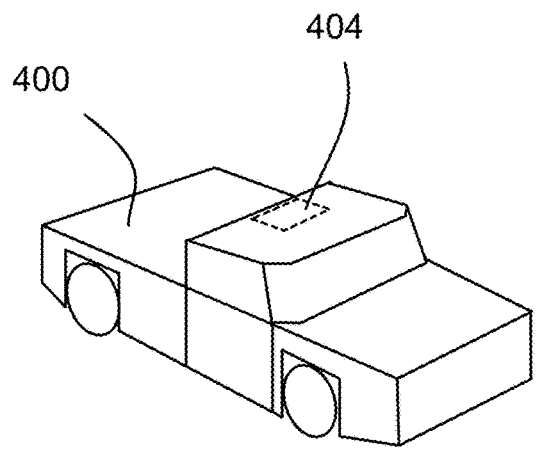
FIG. 13 is a perspective view of a ground-based remotely controlled motile device in accordance with yet another embodiment.

FIG. 13 shows a remotely controlled motile device 400 having a single fiducial point 404 on its top surface. The single fiducial point 404 can be used to track at least the position of the remotely controlled motile device 400. Further, the single fiducial point 404 can be used to determine the orientation of the remotely controlled motile device 400 in some embodiments.

Figure 14:
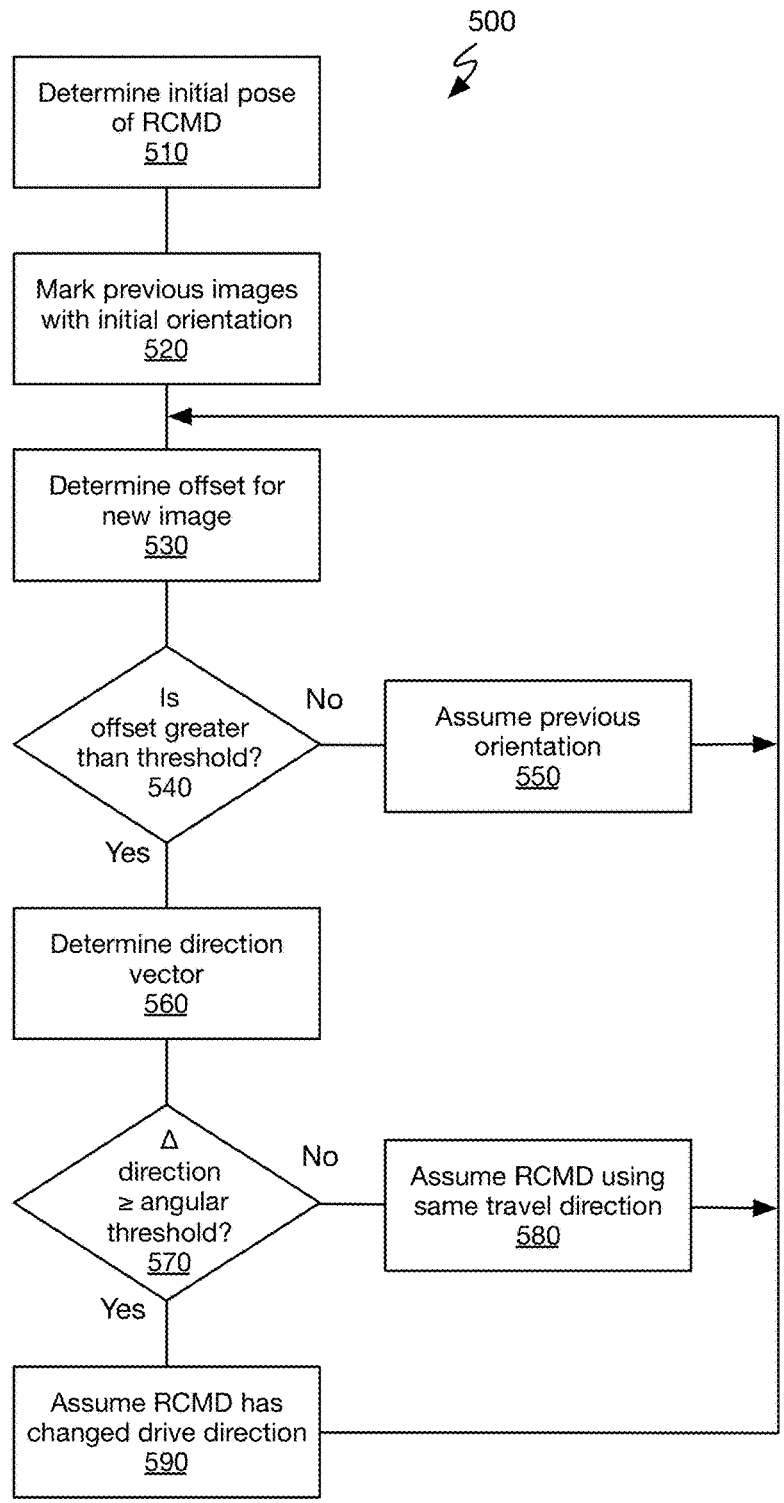
FIG. 14 is a flowchart of a method of determining the orientation of a remotely controlled motile device, such as that of FIG. 13.

FIG. 14 shows a general method 500 of determining the pose of a remotely controlled motile device having a single fiducial point, such as the remotely controlled motile device 400 of FIG. 13. The method 500 commences with a determination of an initial pose for the remotely controlled motile device (510). Images of the remotely controlled motile device captured via a camera of a mobile smart device are traversed until one is expected to be associated with the remotely controlled motile device's movement (i.e., motors are on and tracking was successful). This is done to estimate the remotely controlled motile device's initial movement direction—not only orientation, but also to estimate whether it was moving forward or backward. Once the initial orientation is determined at 510, all previous images are marked with this initial orientation (520).

Then, for each following image, the position offset between the position of the fiducial point in the new image and the previous image is calculated (530). It is determined if the position offset is smaller than a given threshold (540). Currently, a distance of 0.9 centimeters is used as a threshold for performing an orientation determination. If it is determined at 540 that the position offset is not greater than the threshold, the remotely controlled motile device is assumed to still have the previous orientation (550). This reduces the impact of noisy readings when the car is stationary or moving very slowly.

If, instead, the position offset between the new image and the previous image is greater than the threshold, it is determined that the remotely controlled motile device has changed orientation and a direction vector between the position of the fiducial point in the new image and the previous image is calculated (560). It is then determined if the newly determined direction vector differs from the previously-determined orientation of the remotely controlled motile device by an angular threshold (570). The angular threshold is used to determine whether the remotely controlled motile device appears to be moving in the same travel direction (i.e., forwards or backwards) or not. In a current embodiment, this angular threshold is 80 degrees, but can be other angles in other scenarios. This angular threshold may depend on the frame rate, the speed and turning radius of the remotely controlled motile device, etc. The remotely controlled motile device's motor levels in the time of the new image indicate which situation occurred. The motor level samples alone are commonly misleading. As data samples indicate, players usually start accelerating a remotely controlled motile device, such as a car, on the opposite direction whilst the car is still in movement, thus the car decelerates for a number of frames until it actually starts moving on the opposite direction. But once this direction change occurs, it is considered to be the same (even if there are varied readings of forward/reverse motor levels) until a next steep angle change is found.

If the newly determined direction vector does not differ from the previously-determined orientation of the remotely controlled motile device by the angular threshold, the remotely controlled motile device is assumed to be oriented in the same travel direction (580). The direction vector is then assumed to be the new orientation of the remotely controlled motile device. If, instead, the newly determined direction vector differs from the previously-determined orientation of the remotely controlled motile device by the angular threshold, the remotely controlled motile device is assumed to have changed direction of travel (590). That is, if the remotely controlled motile device was traveling in a forward direction, it is assumes to have changed to going in a reverse direction. Alternatively, if the remotely controlled motile device was traveling in a reverse direction, it is assumed to have changed to going in a forward direction. The direction vector is then assumed to be the new orientation of the remotely controlled motile device.

After the determination of the orientation of the remotely controlled motile device at 550, 580, or 590, a new image is examined at 530. This repeats as needed to determine the pose of the remotely controlled motile device.

Figure 15:
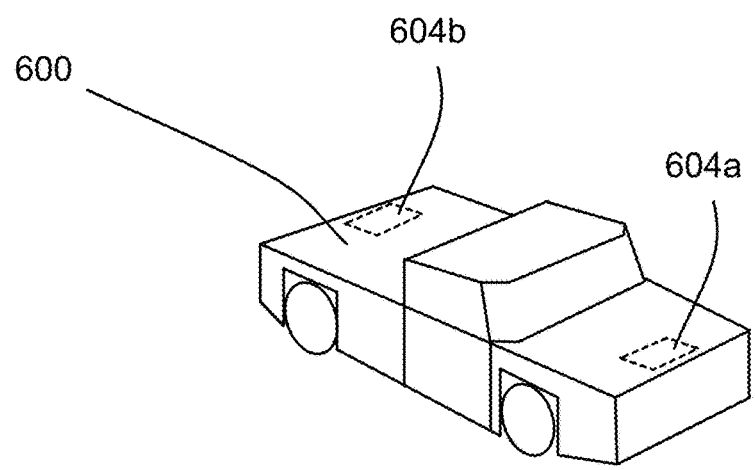
FIG. 15 is a perspective view of a ground-based remotely controlled motile device in accordance with yet another embodiment.

FIG. 15 shows a remotely controlled motile vehicle 600 having a front fiducial point 604a at a front end of the remotely controlled motile vehicle 600 and a back fiducial point 604b at a back end of the remotely controlled motile vehicle 600. The remotely controlled motile vehicle 600 is a ground-based vehicle and, in particular, a car. Using the relative locations of the front fiducial point 604a and the back fiducial point 604b, the orientation and position (i.e., the pose) of the remotely controlled motile vehicle 600 can be readily determined. Preferably, the remotely controlled motile vehicle 600 is designed such that the front fiducial point 604a and the back fiducial point 604b are visible from almost any vantage point where the line of sight to the remotely controlled motile vehicle 600 is generally unobstructed.

6.0 Alternative Optical Reference Structures

In the examples shown, an optical reference grid has been provided as the optical reference structure, however it will be understood that the optical reference structure need not be a grid. For example, the optical reference structure may be some other shape than rectangular. For example, the optical reference structure may be triangular or may be shaped in the form of some other polygon, or as a further alternative, may be shaped in a curvilinear form and nota polygonal form (e.g., a cylindrical form). In yet another alternative, the optical reference structure may be a structure that is assembled by the user, e.g., from a plurality of mat sections, or even from a plurality of construction elements such as bricks or blocks or the like. As many fiducial points as desired and as are suitable can be provided on the optical reference structure such that the system is capable of determining how to represent it onscreen on the smart device.

In this disclosure the terms module, block, processing step have been used interchangeably as those skilled in the art will understand that a given logical function can be carried out via software executed over a data processor, via dedicated hardware, or a combination of both. Further, in practice in not necessary that a particular function or processing block be carried out in a segmented software module or hardware module, rather the functional equivalent can be carried out over a distributed system. Those skilled in the art will understand that a variety of other modifications may be effected to the embodiments described herein without departing from the scope of the appended claims.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A remotely controlled motile device system, comprising:
   a remotely controlled motile device; and
   a mobile smart device, comprising a data processor operatively connected to a display screen, a memory, a user input interface, a camera, and a wireless transceiver, wherein the memory stores computer-readable instructions that, when executed by the data processor, cause the mobile smart device to capture images via the camera of an optical reference background and the remotely controlled motile device, present the images on the display screen, register a target position relative to the optical reference background and entered via the user input interface, determine a pose of the remotely controlled motile device relative to the optical reference background at least partially based on at least one of the captured images, and transmit commands via the wireless transceiver to the remotely controlled motile device to move to the target position.

2. A remotely controlled motile device system according to claim 1, wherein the mobile smart device registers the target position received via the user input interface in two dimensions.

3. A remotely controlled motile device system according to claim 1, wherein the mobile smart device comprises a touch screen that registers the target position received via the user input interface as a point one of at and above a surface of the optical reference background.

4. A remotely controlled motile device system according to claim 1, wherein the mobile smart device comprises a touch screen that registers the target position received via the user input interface as a point along a surface of the optical reference background.

5. A remotely controlled motile device system according to claim 1, wherein the mobile smart device registers the target position received via the user input interface in three dimensions.

6. A remotely controlled motile device system according to claim 1, wherein the remotely controlled motile device comprises a set of fiducial points, and the computer-readable instructions that, when executed by the data processor, cause the mobile smart device to implement a visual pose estimator that comprises a blob tracker that determines the pose of the remotely controlled motile device by detecting the set of fiducial points relative to the optical reference background.

7. A remotely controlled motile device system according to claim 1, wherein the remotely controlled motile device comprises a set of fiducial points, and the computer-readable instructions, when executed by the data processor, cause the mobile smart device to implement a visual pose estimator that comprises a surface design tracker which determines the pose of the remotely controlled motile device based on the surface design of the remotely controlled motile device relative to the optical reference background.

8. A remotely controlled motile device system according to claim 1, wherein the computer-readable instructions, when executed by the data processor, cause the mobile smart device to determine the commands to move the remotely controlled motile device to the target position.

9. A remotely controlled motile device system, comprising:
   a remotely controlled motile device; and
   a mobile smart device, comprising a data processor operatively connected to a memory, a camera, and a wireless transceiver, wherein the memory stores computer-readable instructions that, when executed by the data processor, cause the mobile smart device to capture images via the camera of the remotely controlled motile device, determine a pose of the remotely controlled motile device relative to the mobile smart device at least partially based on at least one of the captured images, and transmit commands via the wireless transceiver to the remotely controlled motile device to rotate the remotely controlled motile device to a set orientation relative to one of the orientation and the position of the mobile smart device.

10. A remotely controlled motile device system according to claim 9, wherein the mobile smart device comprises a user input interface, and wherein the computer-readable instructions, when executed by the mobile smart device, cause the mobile smart device to receive commands to translate the remotely controlled motile device via the user input interface and to transmit the commands to the remotely controlled motile device.

11. A remotely controlled motile device system according to claim 10, wherein the remotely controlled motile device is a flying remotely controlled motile device.

12. A remotely controlled motile device system according to claim 10, wherein the user interface comprises a control for launching and landing the remotely controlled motile device without further player intervention.

13. A remotely controlled motile device system according to claim 10, wherein the flying remotely controlled motile device hovers stably without player intervention.

14. A remotely controlled motile device system according to claim 9, wherein the remotely controlled motile device comprises at least three fiducial points, and wherein the mobile smart device determines the pose of the remotely controlled motile device using the at least three fiducial points.

15. A remotely controlled motile device system according to claim 9, wherein the mobile smart device comprises an orientation sensor for registering changes in the orientation of the mobile smart device.

16. A remotely controlled motile device system according to claim 9, wherein the remotely controlled motile device comprises an inertial measurement unit, wherein the remotely controlled motile device transmits inertial data captured via the inertial measurement unit to the mobile smart device, wherein execution of the computer-readable instructions causes the mobile smart device to implement an inertial dead reckoning estimator that generates inertial pose estimates using the inertial data, and to determine the pose of the remotely controlled motile device by augmenting the visual pose estimates with the inertial pose estimates.

* * * * *